(12) United States Patent
Jaaskelainen et al.

(10) Patent No.: US 10,961,844 B2
(45) Date of Patent: Mar. 30, 2021

(54) SYSTEMS AND METHODS TO IMPROVE DISTRIBUTED ACOUSTIC SENSING PROPERTIES OF OPTICAL FIBERS

(71) Applicant: Halliburton Energy Services, Inc., Houston, TX (US)

(72) Inventors: Mikko Jaaskelainen, Katy, TX (US); Ira Jeffrey Bush, Los Angeles, CA (US)

(73) Assignee: Halliburton Energy Services, Inc., Houston, TX (US)

(*) Notice: Subject to any disclaimer, the term of this patent is extended or adjusted under 35 U.S.C. 154(b) by 75 days.

(21) Appl. No.: 16/315,989

(22) PCT Filed: Sep. 30, 2016

(86) PCT No.: PCT/US2016/054990
§ 371 (c)(1),
(2) Date: Jan. 7, 2019

(87) PCT Pub. No.: WO2018/063390
PCT Pub. Date: Apr. 5, 2018

(65) Prior Publication Data
US 2019/0301278 A1    Oct. 3, 2019

(51) Int. Cl.
*E21B 47/12*    (2012.01)
*E21B 47/135*   (2012.01)
(Continued)

(52) U.S. Cl.
CPC .......... *E21B 47/135* (2020.05); *E21B 17/206* (2013.01); *E21B 47/12* (2013.01);
(Continued)

(58) Field of Classification Search
CPC ............................... E21B 47/12; E21B 17/206
See application file for complete search history.

(56) References Cited

U.S. PATENT DOCUMENTS 7,471,710 B2    12/2008   Cliche et al.
7,668,411 B2 *   2/2010   Davies ................... G01H 9/004
                                                        385/12
(Continued)

FOREIGN PATENT DOCUMENTS

CA          2978671 A1      9/2016
WO       2014200986 A1     12/2014

OTHER PUBLICATIONS

International Search Report and Written Opinion dated Jun. 8, 2017; International PCT Application No. PCT/US2016/054990.
(Continued)

*Primary Examiner* — Catherine Loikith
(74) *Attorney, Agent, or Firm* — McGuire Woods LLP (57) ABSTRACT

Distributed The disclosed embodiments include distributed acoustic sensing (DAS) systems, methods to improve DAS properties of optical fibers, and optical fibers having improved DAS properties. In one embodiment, the system includes an optoelectronic device operable to generate optical pulses. The system also includes an optical fiber having a first end and a second end. The optical fiber is formed from a material having a Rayleigh back-scattering coefficient, and is operable to transmit optical pulses from the first end towards the second end and to reflect a first portion of the optical pulses towards the first end. The system further includes perturbations that are selectively imprinted on the optical fiber, where the perturbations are compatible with a range of wavelengths and are operable to reflect a second portion of the optical pulses towards the first end of the optical fiber if a wavelength of the optical pulses is within the range.

18 Claims, 5 Drawing Sheets

(51) Int. Cl.
  *G01H 9/00* (2006.01)
  *G01N 29/24* (2006.01)
  *E21B 17/20* (2006.01)
  *G01L 1/24* (2006.01)

(52) U.S. Cl.
  CPC ............ *G01H 9/006* (2013.01); *G01N 29/24* (2013.01); *G01N 29/2418* (2013.01); *G01L 1/242* (2013.01)

(56) References Cited

U.S. PATENT DOCUMENTS

| | | |
|---|---|---|
| 7,719,666 B2 | 5/2010 | Kishida et al. |
| 10,203,264 B2 * | 2/2019 | Preston .............. G01M 11/3145 |
| 2011/0090496 A1 | 4/2011 | Samson et al. |
| 2012/0017687 A1 | 1/2012 | Davis et al. |
| 2012/0255362 A1 | 10/2012 | Den Boer et al. |
| 2013/0211726 A1 | 8/2013 | Mestayer et al. |
| 2013/0333476 A1 * | 12/2013 | Omichi .................. G01H 9/004 73/655 |
| 2014/0097848 A1 | 4/2014 | LeBlanc et al. |
| 2014/0345388 A1 | 11/2014 | Den Boer et al. |
| 2015/0146759 A1 | 5/2015 | Johnston |
| 2016/0187223 A1 * | 6/2016 | Preston .............. H04B 10/2575 356/73.1 |

OTHER PUBLICATIONS

Canadian Office Action dated Sep. 30, 2020, Canadian Patent Application No. 3,027,853.

* cited by examiner

SYSTEMS AND METHODS TO IMPROVE DISTRIBUTED ACOUSTIC SENSING PROPERTIES OF OPTICAL FIBERS

BACKGROUND

The present disclosure relates generally to distributed acoustic sensing (DAS) systems, methods to improve DAS properties of optical fibers, and optical fibers having improved DAS properties.

Optical fibers are sometimes used in a wellbore to facilitate fiber optic communications with downhole tools and devices and for optical sensing of a downhole environment. For example, optical fibers may be utilized to perform DAS of various downhole conditions, such as but not limited to the pressure, vibration, strain, displacement, velocity, torque, acceleration, as well as other properties of the downhole environment.

Many DAS systems that transmit optical signals through an optical fiber utilize a Rayleigh back-scatter property of said optical fiber to back-scatter a portion of the optical signals. However, the responsivities of many DAS systems using low-loss telecommunications type fibers for sensing are limited to Rayleigh back-scattering signal levels that are below the desired levels for high performance sensing applications. Although, there are various methods to increase the Rayleigh back-scattering, such as adding dopants to an optical core of the optical fiber, such methods also increase optical attenuation along the optical fiber, lower the Modulation Instability threshold of said optical fiber, and thereby reduce the signal-to-noise (SNR) ratio over the length of the optical fiber.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to DAS systems, optical fibers having improved DAS properties, and methods to improve DAS properties of optical fibers. More particularly, the present disclosure relates to systems and methods that utilize one or more perturbations that are compatible with a range of wavelengths to provide additional reflection of optical signals that have a wavelength within the range of wavelengths without significantly increasing the attenuation of the optical fiber.

An optical fiber having a plurality of perturbations imprinted on different sections of the optical fiber is deployed in a downhole environment to provide DAS of wellbore, formation, and hydrocarbon properties proximate the optical fiber. An optoelectronic device, such as a laser, is coupled to the optical fiber or deployed proximate to the optical fiber. The optoelectronic device is operable to transmit optical signals having a range of wavelengths. Optical signals transmitted from the optoelectronic device traverse downhole through the optical fiber to reach one or more sections of the optical fiber that are deployed proximate one or more regions of interest, where a region of interest is defined to include one or more regions of the wellbore or the surrounding formation that DAS may be utilized to determine one or more properties of said one or more regions. Regions of interest may include one or more production zones, fracture zones, isolated zones, water zones, as well as other downhole regions and zones proximate one or more sections of the optical fiber. Regions of interest may also include one or more sections of the wellbore, as well as tools deployed in and around the wellbore. As the optical signals traverse the optical fiber, intrinsic properties of the optical fiber cause a portion of the optical signals to scatter or reflect back (Rayleigh back-scatter) towards the surface, where the Rayleigh back-scattered optical signals are processed by the optoelectronic device or another device that is operable to process the Rayleigh back-scattered optical signals to determine one or more properties proximate the regions of interest.

As disclosed in the paragraphs below, only a portion of the signals transmitted from the optoelectronic device is Rayleigh back-scattered by the optical fiber. Further, the signal-to-noise ratio (SNR), signal-to-interference-plus-noise ratio (SINR), as well as other ratios indicative of the signal strength of the Rayleigh back-scattered signals received by the optoelectronic device as well as a ratio of said signal strength of the Rayleigh back-scattered signals relative to the signal strength of the optical signals transmitted downhole are at least based on the optical fiber's Rayleigh back-scattering coefficient of the optical fiber, the distance the Rayleigh back-scattered optical signals travel along the optical fiber before reaching the optoelectronic device, as well as other factors disclosed herein. Regions of interest such as production zones are typically thousands of feet underground and may extend several miles underground. As such, the SNR, SINR, as well as other measurements indicative of the signal strength of the back-scattered signals deteriorate as the distance traveled by the back-scattered signals increases.

The perturbations are selectively imprinted on sections of the optical fiber that are deployed proximate to the regions of interest and are compatible with a range of wavelengths of optical pulses. The perturbations are operable to partially reflect optical signals within the range of wavelengths back towards the surface where the reflected optical signals are superimposed with the back-scattered signals. Further these perturbations are created such that the reflections created are not "scattered" uniformly, but rather produce partial reflections which are contained within the numerical aperture of the fiber, thus within the guided region in the fiber. This manner of creating "guided" back-reflections (guided back-scatter) is vastly more efficient than the Rayleigh process which scatters light uniformly in all directions where much of this scattered light is lost. The superimposed optical signals not only increase the amount of reflected optical signals, but also have improved signal qualities (e.g. improved SNR, improved SINR, or other measurements indicative of signal quality or signal strength). In some embodiments, the perturbations have different refractive indexes relative to the refractive index of the optical core, thereby form wavelength specific dielectric mirrors that partially reflect optical signals of specific wavelengths or wavelength ranges.

In some embodiments, a first set of perturbations having a first refractive index periodicity and imprinted on a first section of the optical fiber that is deployed proximate to a first production zone is operable to reflect optical signals (provide a guided back-scatter) having approximately a first wavelength or wavelength range. When the optoelectronic device transmits optical signals having the first wavelength range through the optical fiber, a portion of the signals is Rayleigh back-scattered due to the properties of the optical fiber, and a portion of the optical signals is guided back-scattered by the first set of perturbations. The Rayleigh back-scatted optical signals and the guided back-scattered optical signals superimpose each other to form superimposed optical signals having approximately a first wavelength. Additional perturbations having different refractive index periodicities may be imprinted on different sections of the optical fiber that are deployed proximate to different production zones to reflect optical signals having different wavelengths within the range of wavelengths, and to form different areas with augmented DAS sensitivity. In further embodiments, each set of perturbations may be operable to provide guided back-scattering of optical signals having a range of wavelengths. In one of such embodiments, different sets of perturbations are operable to reflect different optical signals having different ranges of wavelengths. Additional descriptions of the foregoing system and method to improve DAS properties of the optical fiber as well as the properties of the optical fiber are described in the paragraphs below and are illustrated in at least FIGS. 1-4.

Figure 1A:
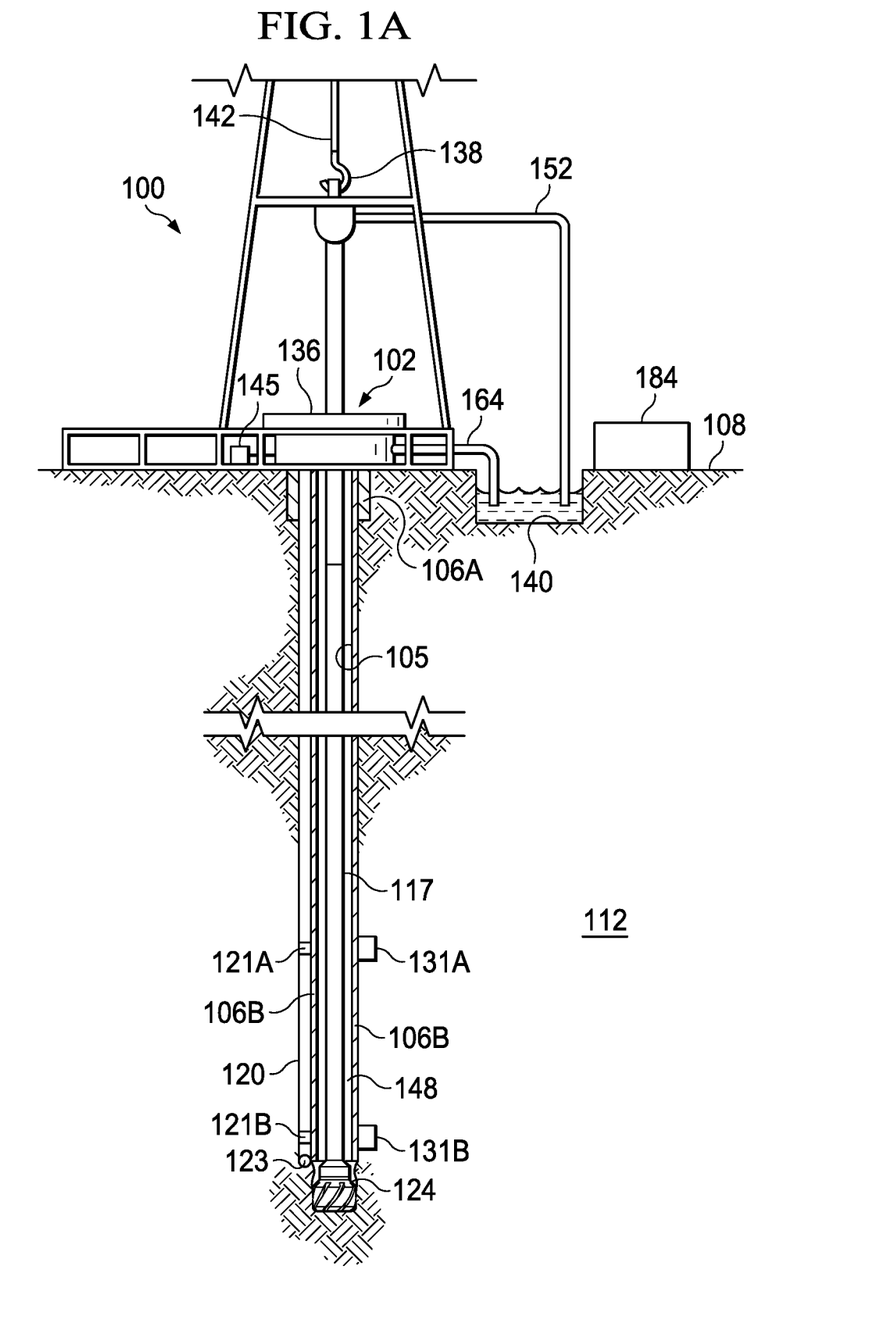
FIG. 1A is a schematic, side view of a logging environment in which an optical fiber is deployed along a production casing to facilitate DAS of the downhole environment.

Turning now to the figures, FIG. 1A is a schematic, side view of a logging environment 100 in which an optical fiber 120 is deployed along a production casing 106B to facilitate DAS of the downhole environment 100. In the embodiment of FIG. 1A, a well 102 includes a wellbore 105 encased by a surface casing 106A and a production casing 106B. The wellbore 105 extends from a surface 108 of the well 102 to or through a subterranean formation 112. In some embodiments, the optical fiber 120 has an end-to-end length of at least 100 meters. In other embodiments, the optical fiber has an end-to-end length of at least 500 meters. In further embodiments, the optical fiber has an end-to-end length of at least one kilometer. The surface casing 106A and the production casing 106B insulate downhole tools and strings deployed in the wellbore 105 as well as hydrocarbon resources flowing through the wellbore 105 from the surrounding formation 112, prevent cave-ins, and prevent contamination of the surrounding formation 112.

A hook 138, cable 142, traveling block (not shown), and hoist (not shown) are provided to lower a string 117 coupled to a drill bit 124 down the wellbore 105, or to lift the string 117 up from the wellbore 105. The string 117 may be a wireline tool string, a slickline tool string, a drill string, or another type of tool string operable to deploy the drill bit as well as other tools (not shown) used in the logging environment 100 of FIG. 1A or a similar environment. At wellhead 136, an inlet conduit 152 is coupled to a fluid source (not shown) to provide fluids, such as drilling fluids, downhole. In some embodiments, the string 117 has an internal passage that provides a fluid flow path from the surface 108 downhole. In some embodiments, the fluids travel down the string 117 and exit the string 117 through the drill bit 124. The fluids flow back toward the surface 108 through a wellbore annulus 148, and exit the wellbore annulus 148 via an outlet conduit 164 where the fluids are captured in a container 140.

The optical fiber 120 has one end (first end) that is operable to receive optical signals from an optoelectronic device 145 and another end (second end) coupled to a termination component 123 such as a termination housing or another component or material that forms a low reflectance termination of the optical fiber 120. As defined herein, the optoelectronic device 145 may include any device operable to transmit optical signals having a signal wavelength or having multiple wavelengths within a range of wavelengths. In some embodiments, the optoelectronic device 145 is a DAS interrogator such as a tunable laser. In some embodiments, the optoelectronic device 145 is electronically controlled and utilizes a feedback loop to generate optical signals within a specific frequency range.

The first end of the optical fiber 120 has a numerical aperture that is approximately equal to $\sin(\frac{1}{2})*\emptyset$, where $\emptyset$ is approximately an acceptance angle of an acceptance cone at the first end of the optical fiber 120. As defined herein, the numerical aperture is an approximate range of acceptance angles rotated around a longitudinal axis of the optical fiber 120, where optical signals may be coupled into a waveguide (e.g., the optical core) of the optical fiber 120. For example, if the numerical aperture of the first end of the optical fiber 120 is approximately 0.14, then the acceptance angle is approximately 16° (approximately +/−8° relative to the longitudinal axis of the optical fiber 120. As the optical signals traverse through the optical fiber 120, a portion (a first portion) of the optical signals are Rayleigh back-scattered by the optical fiber 120, and the remaining optical signals continue onwards towards the second end of the optical fiber 120. As stated herein, merely increasing the Rayleigh back-scattering coefficient of the optical fiber 120 also increases signal attenuation of the back-scattered signals.

The optical fiber 120 includes a first set of perturbations 121A imprinted along a first section of the optical fiber 120 that is deployed proximate a first region of interest 131A. The first set of perturbations 121A includes at least one perturbation having a first refractive index periodicity and operable to reflect optical signals having approximately a first range of wavelengths. When the optoelectronic device 145 transmits optical signals within approximately the first range of wavelengths through the optical fiber 120, the first set of perturbations 121A is operable to provide a guided back-scatter of a portion (a second reflected portion) of the optical signals. In some embodiments, the second reflected portion of the optical signals has an amplitude indicative of signal intensity that is at least a first threshold ratio of the signal intensity of the first portion of the optical signals. In one of such embodiments, the signal intensity of the second reflected portion of the optical signals is approximately three times to ten times the signal intensity of the first portion of the optical signals. As such, the first threshold ratio would be 3 to 10× that of the Rayleigh back-scatter coefficient of the optical fiber 120.

The second reflected portion of the optical signals is operable to superimpose with the first reflected portion of the optical signals, which are reflected due to the intrinsic properties of the optical fiber 120. The superimposed optical signals traverse back towards the surface 108 and are processed by controller 184. In some embodiments, signal loss of the optical pulses due to the first set of perturbations 121A is less than a first threshold of 0.25 db/km in excess of the fiber's intrinsic loss, which is significantly less than signal loss due to increased dopants to the optical core. In other embodiments, the signal loss of the optical pulses due to the first set of perturbations 121A is less than a second threshold of 0.5 db/km in excess of the fiber's intrinsic loss. In further embodiments the signal loss of the optical pulses due to the first set of perturbations 121A is between 0.1 db/km to 0.75 db/km in excess of the fiber's intrinsic loss. As such, by selectively imprinting perturbations along sections of the optical fiber 120, a greater amount of optical signals transmitted by the optoelectronic device 145 may be reflected back and processed by the controller 184.

The optical fiber 120 also includes a second set of perturbations 121B imprinted along a second section of the optical fiber 120 that is deployed proximate a second region of interest 131B. The second set of perturbations 121B includes at least one perturbation having a second refractive index periodicity and operable to reflect optical signals having approximately a second range of wavelengths. When the optoelectronic device 145 transmits optical signals within approximately the second range of wavelengths through the optical fiber 120, the second set of perturbations 121B is operable to provide a guided back-scatter of a portion (a third reflected portion) of the optical signals. In some embodiments, the third reflected portion of the optical signals has a signal intensity that is at least a threshold ratio of the signal intensity of the first portion of the optical signals. The third reflected portion of the optical signals is also operable to superimpose with the first reflect portion of the optical signals, which are reflected due to the intrinsic properties of the optical fiber. The superimposed optical signals traverse back towards the surface 108 and are processed by the controller 184.

Figure 1B:
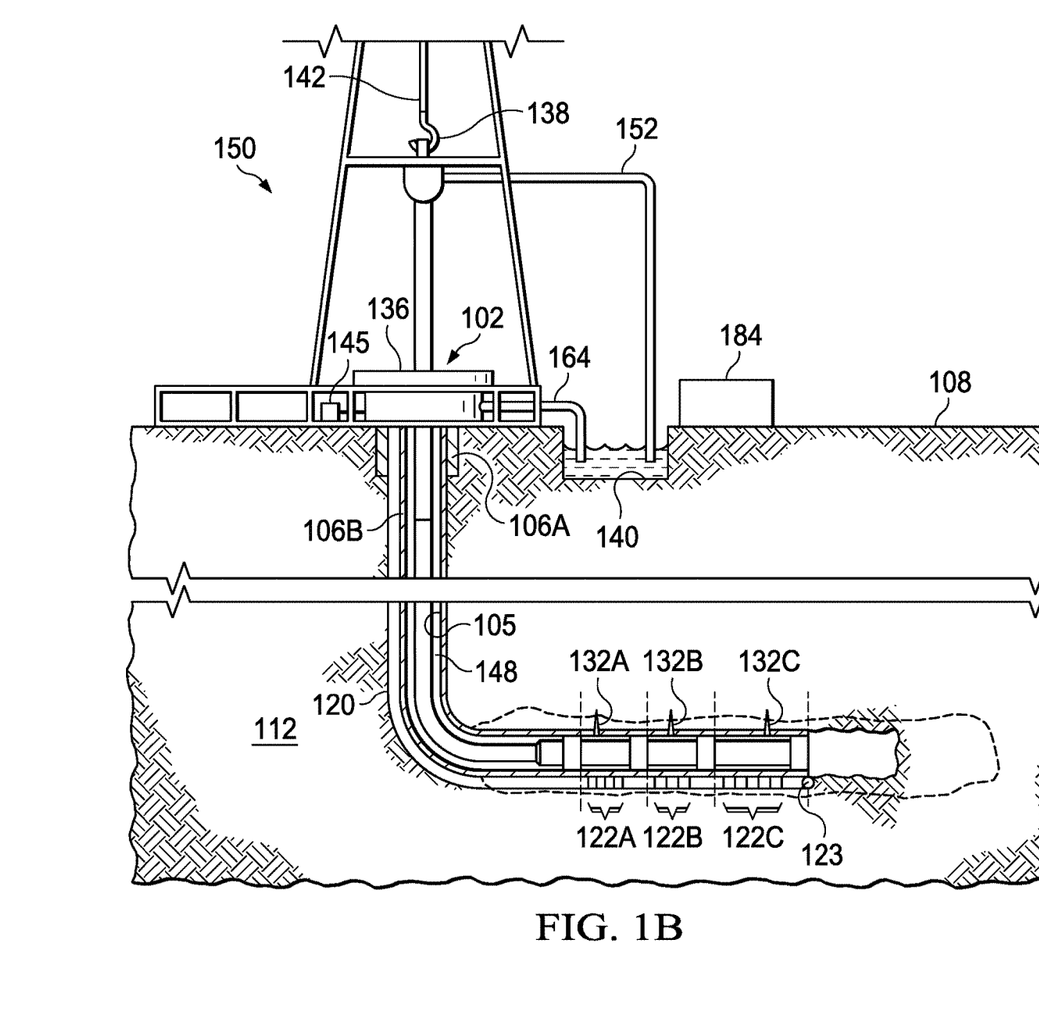
FIG. 1B is a schematic, side view of a hydrocarbon production environment in which an optical fiber is deployed along a production casing to facilitate DAS of the downhole environment.

FIG. 1B is a schematic, side view of a hydrocarbon production environment 150 in which the optical fiber 120 is deployed along the production casing 106B to facilitate DAS of the downhole environment 150. As shown in FIG. 1B, a first set of perturbations 122A is imprinted along a section of the optical fiber 120 that is deployed proximate a first region of interest (a first production zone) 132A, a second set of perturbations 122B is imprinted along a section of the optical fiber 120 that is deployed proximate a second region of interest (a second production zone) 132B, and a third set of perturbations 122C is imprinted along a section of the optical fiber 120 that is deployed proximate a third region of interest (a third production zone) 132C. The first, second, and third sets of perturbations 122A, 122B, and 122C, similar to the first and second sets of perturbations 112A and 122B, provide guided back-scatter of the optical signals transmitted from the optoelectronic device 145, where the guided back-scatter of the optical signals superimpose with the Rayleigh back-scattered optical signals. In other embodiments, additional sets of one or more perturbations may be imprinted on other sections of the optical fiber 120 and deployed proximate to other regions of interest. Further, different sets of perturbations may include different numbers of perturbations having different refractive index periodicities and operable to reflect back different portions of the optical signals.

Figure 3A:
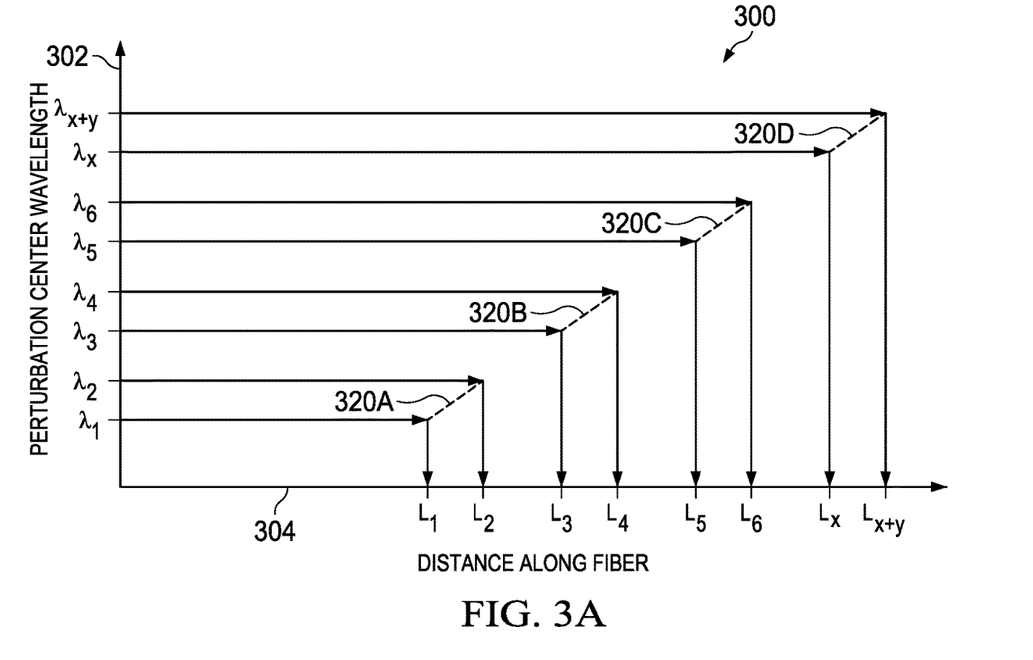
FIG. 3A is a graph that illustrates guided back-scatter along multiple sections of the optical fiber deployed in environments similar to the environments of FIGS. 1A and 1B, where the guided back-scatter is generated by perturbations that are compatible with different wavelengths.
Figure 3B:
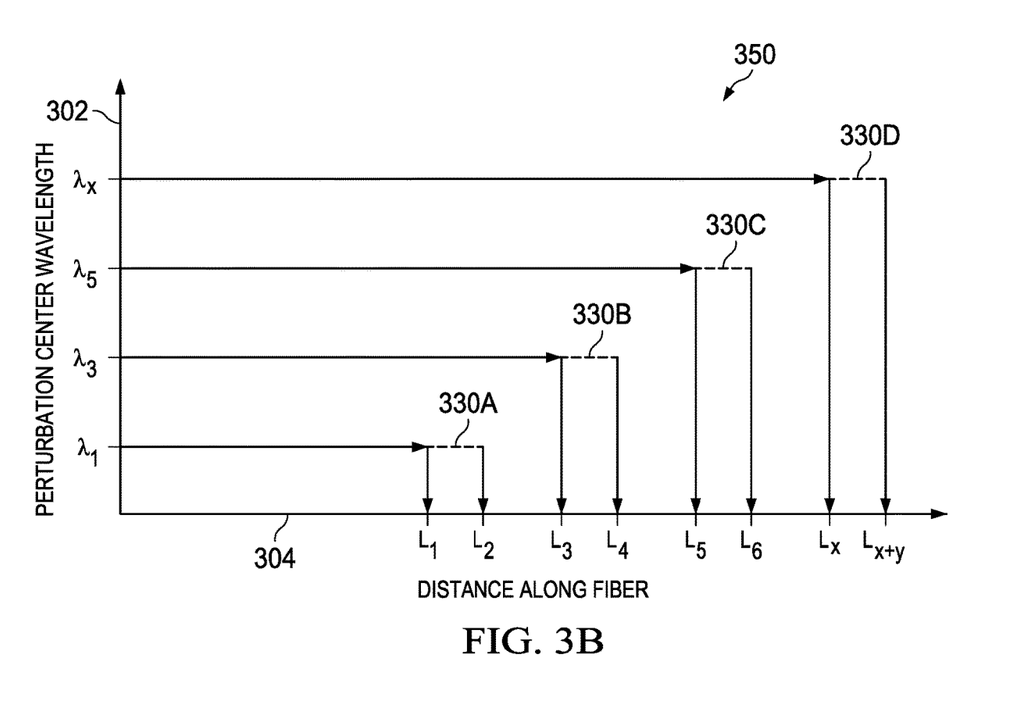
FIG. 3B is a graph that illustrates guided back-scatter along multiple sections of the optical fiber deployed in environments similar to the environments of FIGS. 1A and 1B, where the guided back-scatter is generated by perturbations that are compatible with specific wavelengths.
Figure 4:
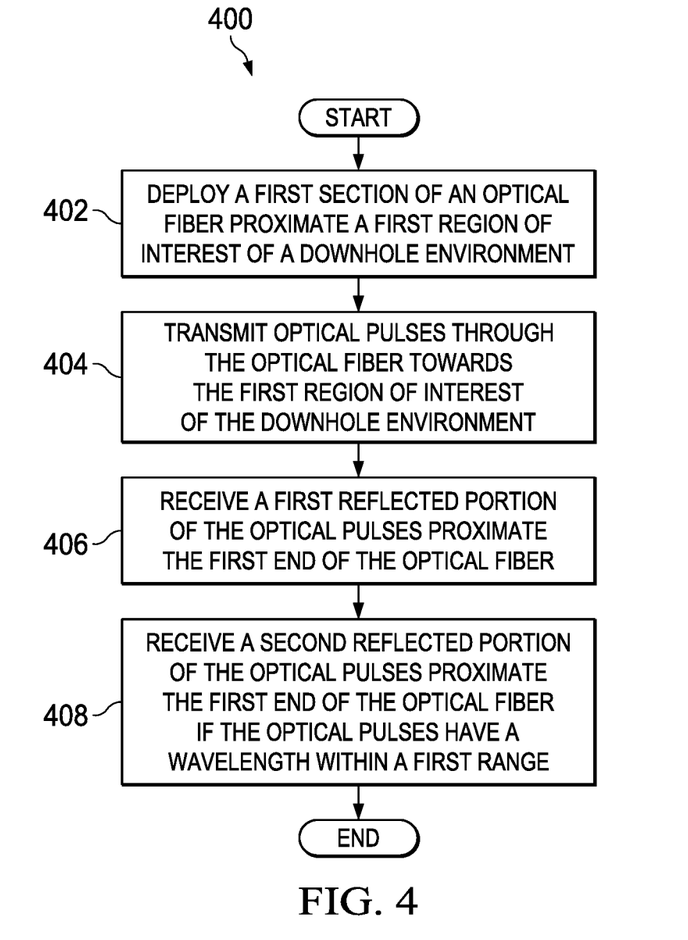
FIG. 4 is a flow chart of a process to improve DAS properties of the optical fiber deployed in environments similar to the environments of FIGS. 1A and 1B.

Although FIGS. 1A and 1B illustrate sets of perturbations deployed along two or three sections of the optical fiber 120, respectively, in other embodiments, the perturbations are uniformly imprinted along the optical fiber 120. In further embodiments, each set of perturbations is imprinted on a portion of a section of the optical fiber (e.g., every other half meter, every other third meter) to provide a desired guided back-scatter. In some embodiments, the perturbations are fiber bragg gratings. In one of such embodiments, the perturbations form an array of chirped fiber bragg gratings. In another one of such embodiments, the perturbations form an array of super structure fiber bragg gratings. In a further one of such embodiments, one or more sets of perturbations form a broad band, which is operable to reflect optical signals having a range of different wavelengths. In further embodiments, different sets of perturbations imprinted on different portions of the optical fiber have different refractive index profiles. In one of such embodiments, one set of the perturbations form an array of chirped fiber bragg gratings, another set of perturbations form an array of super structure fiber bragg gratings, and another set of perturbations form a broad band. In the embodiments illustrated in FIGS. 1A and 1B, the optical fiber 120 is deployed along and outside the production casing 106B. In other embodiments, the optical fiber 120 is deployed inside the production casing 106B. In further embodiments, the fiber 120 is coupled to the string 117 and is deployed together with the string 117. Additional descriptions of the perturbations are provided in the paragraphs below and are illustrated in FIGS. 2-4.

Figure 2:
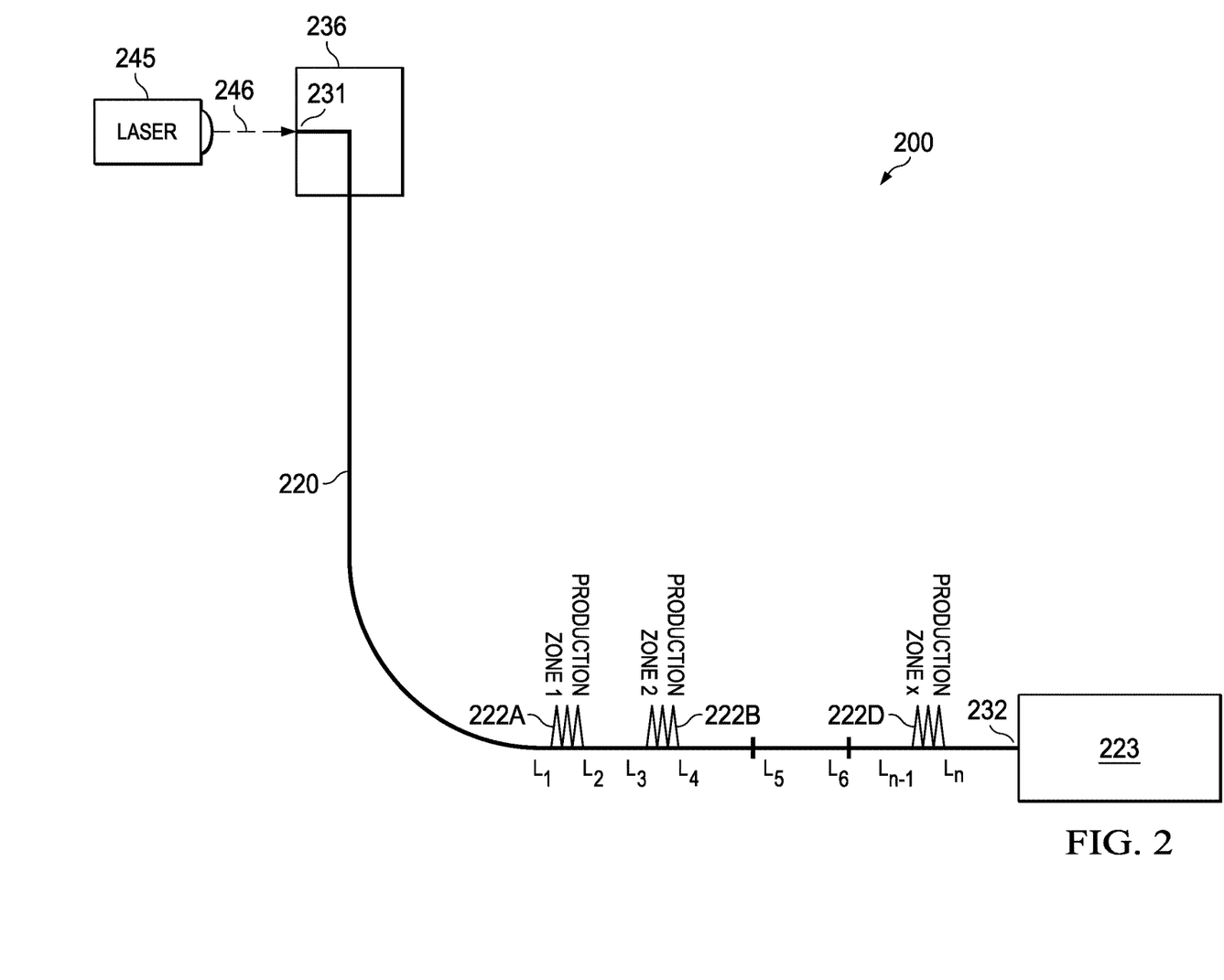
FIG. 2 is a schematic, side view of a DAS system deployed in the logging environment similar to the logging environment of FIG. 1A or the production environment of FIG. 1B.

FIG. 2 is a schematic, side view of a DAS system 200 deployed in a logging environment that is similar to the logging environment 100 of FIG. 1A or the production environment 150 of FIG. 1B. The DAS system 200 includes an optoelectronic device 245 deployed proximate a wellhead 236 and operable to transmit optical signals within a range of wavelengths and in a direction indicated by arrow 246. The optical fiber 220 includes a first end 231 that is coupled to or proximate to the tunable optoelectronic device 245 and a second end 232 that is coupled to or proximate to a termination housing 223. A portion of the optical signals transmitted by the optoelectronic device 245 enters the first end 231 of the optical fiber 220. As the optical signals traverse through the optical fiber 220, a first portion of the optical signals is back-scattered due to intrinsic properties of the optical fiber 220. Further, a first set of perturbations 222A is imprinted along a section of the optical fiber 220 approximately between $L_1$ and $L_2$ from the first end 231 of the optical fiber 220. The first set of perturbations produce a guided back-scatter of a second portion of the optical signals transmitted by the optoelectronic device 245 when the optoelectronic device 245 transmits optical signals having a wavelength within a first range of wavelengths. The first and second portions of the optical signals superimpose each other and traverse back the optical fiber 220 towards the surface where the superimposed optical signals are processed by the controller 184. As stated herein, the superimposed optical signals have greater signal intensity relative to the Rayleigh back-scattered optical signals.

Similarly, a second set of perturbations 222B and a third set of perturbations 222D are also imprinted along a second and a fourth section of the optical fiber 220 approximately between $L_3$ and $L_4$ from the first end 231 and $Ln_{-1}$ and $L_n$ from the first end 231, respectively. The second set of perturbations produce a guided back-scatter of a third portion of the optical signals transmitted by the optoelectronic device 245 when the optoelectronic device 245 transmits optical signals having a wavelength within a second range of wavelengths. The first and the third portions of the optical signals superimpose each other and traverse back the optical fiber 220 towards the surface where the superimposed optical signals are processed by the controller 184. Further, the third set of perturbations produce a guided back-scatter of a fourth portion of the optical signals transmitted by the optoelectronic device 245 when the optoelectronic device 245 transmits optical signals having a wavelength within a third range of wavelengths. The first and fourth portions of the optical signals superimpose each other and traverse back the optical fiber 220 towards the surface where the superimposed optical signals are processed by the controller 184.

The optical fiber 220 also includes a third section approximately between $L_5$ and $L_6$ from the first end 231 and devoid of any perturbation. In such section as well as other sections, where no perturbation is imprinted on the optical fiber 220, the first portion of the optical signals transmitted by the tunable optoelectronic device 245 is still back-scattered (Rayleigh back-scattered) by the optical fiber 220. In some embodiments, a coherent optical time domain reflectometry technique may be utilized by the controller 184 to perform DAS of wellbore and formation properties proximate the third section or other sections devoid of any perturbation.

FIG. 3A is a graph 300 that illustrates guided back-scatter along multiple sections of the optical fiber 120 deployed in environments similar to the environments of FIGS. 1A and 1B, where the guided back-scatter is generated by perturbations that are compatible with different wavelengths. Axis 302 of the graph 300 illustrates the perturbation center wavelength of various perturbations imprinted on the optical fiber 120, whereas axis 304 illustrates distance along the optical fiber 120 relative to the first end of the optical fiber 120. As shown in FIG. 3A, a first set of perturbations having a center wavelength approximately between $\lambda_1$ and $\lambda_2$ are imprinted on the optical fiber 120 at distances approximately between $L_1$ and $L_2$ from the first end of the optical fiber 120. The first set of perturbations 320A are operable to produce a guided back-scatter of approximately a second portion of the optical signals transmitted from the optoelectronic device 145 when the optoelectronic device 145 transmits optical signals having a wavelength approximately between $\lambda_1$ and $\lambda_2$.

Similarly, a second set of perturbations 320B having a center wavelength approximately between $\lambda_3$ and $\lambda_4$ are imprinted on the optical fiber 120 at distances approximately between $L_3$ and $L_4$ from the first end of the optical fiber 120. Further, a third set of perturbations 320C having a center wavelength approximately between $\lambda_5$ and $\lambda_6$ are imprinted on the optical fiber 120 at distances approximately between $L_5$ and $L_6$ from the first end of the optical fiber 120. Further, a fourth set of perturbations 320D having a center wavelength approximately between $\lambda_x$ and $\lambda_{x+y}$ is imprinted on the optical fiber 120 at distances approximately between $L_7$ and $L_8$ from the first end of the optical fiber 120. The second, third, and fourth sets of perturbations 320B, 320C, and 320D are respectively operable to produce guided back-scatter of approximately a third, fourth, and fifth portion of the optical signals transmitted from the optoelectronic device 145 when the optoelectronic device 145 transmits optical signals having a wavelength approximately between $\lambda_3$ and $\lambda_4$, $\lambda_5$ and $\lambda_6$, $\lambda_x$ and $\lambda_{x+y}$, respectively. As stated herein, the guided back-scatter portions of the optical signals and the Rayleigh back-scattered portion of the optical signals superimpose each other to form superimposed optical signals that have greater signal intensity, SNR, and SINR relative to the Rayleigh back-scattered optical signals.

Certain sections of the optical fiber 120, such as sections of the optical fiber that are approximately $L_2$ to $L_3$ from the first end of the optical fiber 120, approximately $L_4$ to $L_5$ from the first end of the optical fiber 120, and approximately $L_6$ to $L_x$ from the first end of the optical fiber 120 are devoid of any perturbation. A first portion of the optical signals transmitted by the optoelectronic device 145 may still be Rayleigh back-scattered due to the properties of the optical fiber 120. As stated herein, a coherent optical time domain reflectometry technique may be utilized by the controller 184 to perform DAS of wellbore and formation properties proximate sections of the optical fiber 120 that are devoid of any perturbation.

FIG. 3B is a graph 350 that illustrates guided back-scatter along multiple sections of the optical fiber 120 deployed in environments similar to the environments of FIGS. 1A and 1B, where the guided back-scatter is generated by perturbations that are compatible with specific wavelengths. As shown in FIG. 3B, a first set of perturbations 330A having a center wavelength approximately $\lambda_1$ is imprinted on the optical fiber 120 at distances approximately $L_1$ to $L_2$ from the first end of the optical fiber 120. The first set of perturbations 330A is operable to produce a guided back-scatter of approximately a second portion of the optical signals transmitted from the optoelectronic device 145 when the optoelectronic device 145 transmits optical signals having a wavelength of approximately $\lambda_1$. Similarly, a second, third, and fourth sets of perturbations 330B 330C, and 330D having a center wavelength approximately $\lambda_3$, $\lambda_5$, and $\lambda_x$ are imprinted on the optical fiber 120 at distances approximately $L_3$ to $L_4$, $L_5$ to $L_6$, and $L_x$ to $L_{x+y}$ from the first end of the optical fiber 120. The second, third, and fourth sets of perturbations 330B, 330C, and 330D are operable to produce guided back-scatter of approximately a third, fourth, and fifth portion of the optical signals transmitted from the optoelectronic device 145 when the optoelectronic device 145 transmits optical signals having a wavelength of approximately $\lambda_3$, $\lambda_5$, and $\lambda_x$.

FIG. 4 is a flow chart of a process 400 to improve DAS properties of the optical fiber deployed in the environments of FIGS. 1A and 1B. Although operations in the process 400 are shown in a particular sequence, certain operations may be performed in different sequences or at the same time where feasible.

At step 402, a first section of an optical fiber 120 is deployed proximate a first region of a downhole environment. The first section of optical fiber includes a first set of perturbations that is operable to produce a guided back-scatter of optical signals having a first range of wavelengths. At step 404, an optoelectronic device such as the optoelectronic device 145, transmits a series of optical pulses through a first end of the optical fiber 120. A portion of the transmitted optical pulses enter the first end of the optical fiber 120 and traverse through the optical fiber 120 towards the first region of interest. A first portion of the transmitted optical pulses is Rayleigh back-scattered by the optical fiber 120, where the back-scattered optical signals traverse back up the optical fiber 120 towards the surface. At step 406, the controller 184 receives a first portion of the transmitted optical pulses.

At step 408, if the transmitted optical pulses have a wavelength within the first range, then the first set of perturbations is operable to produce a guided back-scatter of approximately a second portion of the transmitted optical signals. Further, the controller 184 is operable to receive the second portion of the transmitted optical signals, where the first portion of the transmitted optical pulses and the second portion of the transmitted optical pulses superimpose each other to form superimposed optical pulses. Alternatively, if the optical pulses transmitted by the optoelectronic device 145 are not within the first range of wavelengths, then the process ends and only the first portion of the transmitted optical pulses is received. Additional sections of the optical fiber 120 having one or more sets of perturbations imprinted on said sections may be deployed proximate other regions of interest. As stated herein, the one or more sets of the perturbations may have different refractive index periodicities, or may be operable to perform guided back-scatter of optical signals having different ranges of wavelength, where the back-scattered portion of the transmitted optical signals and the guided back-scatter portion of the optical signals superimpose each other and are processed by the controller 184.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a distributed acoustic sensing system comprising an optoelectronic device operable to generate optical pulses; an optical fiber having a first end and an opposite second end, the optical fiber being formed from a material having a first Rayleigh back-scattering coefficient, and the optical fiber operable to transmit the optical pulses from the first end towards the second end; and reflect a first portion of the optical pulses towards the first end, the first portion of the optical pulses having a first amplitude based on a value of the first Rayleigh back-scattering coefficient; and a first set of perturbations of a plurality of perturbations being selectively imprinted on the optical fiber, the first set of perturbations being compatible with a first wavelength and operable to reflect a second portion of the optical pulses towards the first end of the optical fiber if a wavelength of the optical pulses is within a first range.

Clause 2, the distributed acoustic sensing system of clause 1, wherein one or more perturbations of the first set of perturbations are positioned proximate to a first region of a downhole environment, and wherein the first portion and the second portion of the optical pulses are superimposed to improve signal to noise ratio of distributed acoustic sensing of the first region of the downhole environment.

Clause 3, the distributed acoustic sensing system of clause 1 or 2, further comprising a second set of perturbations of the plurality of perturbations being selectively imprinted on the optical fiber, the second set of perturbations being compatible with a second wavelength and operable to reflect a third portion of the optical pulses towards the first end of the optical fiber if the wavelength of the optical pulses is within a second range, wherein one or more perturbations of the second set of perturbations are positioned proximate to a second region of the downhole environment, and wherein the first portion and the third portion of the optical pulses are superimposed to improve signal to noise ratio of distributed acoustic sensing of the second region of the downhole environment.

Clause 4, the distributed acoustic sensing system of any of clauses 1-3, wherein the optical fiber comprises a third region devoid of any perturbation of the plurality of perturbations, and wherein a coherent optical time domain reflectometry technique is utilized to perform the distributed acoustic sensing of the third region.

Clause 5, the distributed acoustic sensing system of any of clauses 1-4, wherein a signal loss of the optical pulses due to the first set of perturbations is less than a first threshold db/km.

Clause 6, the distributed acoustic sensing system of any of clauses 1-5, wherein an amplitude of the second portion of the optical pulses is greater than the amplitude of the first portion of the optical pulses by a first threshold ratio.

Clause 7, the distributed acoustic sensing system of any of clauses 1-6, wherein the one or more perturbations are uniformly imprinted throughout the optical fiber.

Clause 8, the distributed acoustic sensing system of any of clauses 1-7, wherein the one or more perturbations are fiber bragg gratings.

Clause 9, the distributed acoustic sensing system of any of clauses 1-8, wherein the one or more perturbations form an array of chirped fiber bragg gratings.

Clause 10, the distributed acoustic sensing system of any of clauses 1-9, wherein the one or more perturbations form an array of super structure fiber bragg gratings.

Clause 11, the distributed acoustic sensing system of any of clauses 1-10, wherein different sets of perturbations of the plurality of perturbations have different refractive index profiles, and wherein different sets of perturbations of the plurality of perturbations reflect different wavelengths of optic signals.

Clause 12, an optical fiber having improved distributed acoustic sensing properties, comprising an optical core for transmitting optical pulses from a first end of the optical core towards a second end of said optical core, wherein a first portion of the optical pulses is reflected towards the first end of the optical core, the first portion having an amplitude based on a Rayleigh back-scattering coefficient of the optical fiber; and a first set of perturbations imprinted on a first section of the optical fiber deployed proximate a first region of a downhole environment, the first set of perturbations being compatible with a first wavelength and operable to reflect a second portion of the optical pulses towards the first end of the optical fiber if a wavelength of the optical pulses is within a first range, wherein the first portion and the second portion of the optical pulses are superimposed to improve signal to noise ratio of distributed acoustic sensing of the first region of the downhole environment.

Clause 13, the optical fiber of clause 12, further comprising a second set of perturbations imprinted on a second section of the optical fiber deployed proximate a second region of the downhole environment, the second set of perturbations being compatible with a second wavelength and operable to reflect a second portion of the optical pulses towards the first end of the optical fiber if the wavelength of the optical pulses is within a second range.

Clause 14, the optical fiber of clause 12 or 13, wherein a signal loss of the optical pulses due to the first set of perturbations is less than a first threshold db/km.

Clause 15, the optical fiber of any one of clauses 12-14, wherein an amplitude of the second portion of the optical pulses is greater than a first amplitude of the first portion of the optical pulses by a first threshold ratio.

Clause 16, the optical fiber of any of clauses 12-15, wherein the optical fiber comprises a third region devoid of any perturbation, and wherein a coherent optical time domain reflectometry technique is utilized to perform the distributed acoustic sensing of the third region.

Clause 17, the optical fiber of any of clauses 12-16, wherein the one or more perturbations are fiber bragg gratings.

Clause 18, the optical fiber of any of clauses 12-17, wherein the optical fiber has an end to end length of at least one kilometer.

Clause 19, a method to improve distributed acoustic sensing properties of an optical fiber deployed in a downhole environment, comprising deploying a first section of the optical fiber proximate a first region of the downhole environment, the optical fiber having a first end and an opposite second end, and the optical fiber being formed from a material having a first Rayleigh back-scattering coefficient, the first section of the optical fiber having a first set of perturbations imprinted across said first section of the optical fiber, and each perturbation of the first set of perturbations being compatible with a first wavelength; transmitting optical pulses through the optical fiber towards the first region of the downhole environment; receiving a first reflected portion of the optical pulses proximate the first end of the optical fiber, the first reflected portion having an amplitude based on a Rayleigh back-scattering coefficient of the optical fiber; and receiving a second reflected portion of the optical pulses proximate the first end of the optical fiber if a wavelength of the optical pulses is within a first range, the second reflected portion of the optical pulses being reflected by the first set of perturbations, wherein the first reflected portion and the second reflected portion of the optical pulses are superimposed proximate the first end of the optical fiber.

Clause 20, the method of clause 19, further comprising deploying a second section of the optical fiber proximate a second region of the downhole environment, the second section of the optical fiber having a second set of perturbations imprinted across said second section of the optical fiber, and each perturbation of the second set of perturbations being compatible with a second wavelength; and receiving a third reflected portion of the optical pulses proximate the first end of the optical fiber if the wavelength of the optical pulses is within a second range, wherein the first reflected portion and the third reflected portion of the optical pulses are superimposed proximate the first end of the optical fiber.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A distributed acoustic sensing system comprising:
   an optoelectronic device operable to generate optical pulses;
   an optical fiber having a first end, an opposite second end, and a region devoid of any perturbation, the optical fiber being formed from a material having a Rayleigh back-scattering coefficient, and the optical fiber operable to:
   transmit the optical pulses from the first end towards the second end; and reflect a first portion of the optical pulses towards the first end, the first portion of the optical pulses having a first amplitude based on a value of the Rayleigh back-scattering coefficient; and
   a first set of perturbations of a plurality of perturbations being selectively imprinted on the optical fiber, the first set of perturbations being compatible with a first wavelength and operable to reflect a second portion of the optical pulses towards the first end of the optical fiber if a wavelength of the optical pulses is within a first range,
   wherein a coherent optical time domain reflectometry technique is utilized to perform distributed acoustic sensing of a downhole environment and the region devoid of any perturbation.

2. The distributed acoustic sensing system of claim 1, wherein one or more perturbations of the first set of perturbations are positioned proximate to a first region of a downhole environment, and wherein the first portion and the second portion of the optical pulses are superimposed to improve signal to noise ratio of distributed acoustic sensing of the first region of the downhole environment.

3. The distributed acoustic sensing system of claim 2, further comprising:
   a second set of perturbations of the plurality of perturbations being selectively imprinted on the optical fiber, the second set of perturbations being compatible with a second wavelength and operable to reflect a third portion of the optical pulses towards the first end of the optical fiber if the wavelength of the optical pulses is within a second range,
   wherein one or more perturbations of the second set of perturbations are positioned proximate to a second region of the downhole environment, and wherein the first portion and the third portion of the optical pulses are superimposed to improve signal to noise ratio of distributed acoustic sensing of the second region of the downhole environment.

4. The distributed acoustic sensing system of claim 1, wherein a signal loss of the optical pulses due to the first set of perturbations is less than a first threshold db/km.

5. The distributed acoustic sensing system of claim 1, wherein an amplitude of the second portion of the optical pulses is greater than the amplitude of the first portion of the optical pulses by a first threshold ratio.

6. The distributed acoustic sensing system of claim 1, wherein one or more perturbations of the plurality of perturbations are uniformly imprinted throughout the optical fiber.

7. The distributed acoustic sensing system of claim 1, wherein one or more perturbations of the plurality of perturbations are fiber bragg gratings.

8. The distributed acoustic sensing system of claim 7, wherein the one or more perturbations form an array of chirped fiber bragg gratings.

9. The distributed acoustic sensing system of claim 7, wherein the one or more perturbations form an array of super structure fiber bragg gratings.

10. The distributed acoustic sensing system of claim 1, wherein different sets of perturbations of the plurality of perturbations have different refractive index profiles, and wherein different sets of perturbations of the plurality of perturbations reflect different wavelengths of optic signals.

11. An optical fiber having improved distributed acoustic sensing properties comprising:
an optical core for transmitting optical pulses from a first end of the optical core towards a second end of said optical core, wherein a first portion of the optical pulses is reflected towards the first end of the optical core, the first portion having an amplitude based on a Rayleigh back-scattering coefficient of the optical fiber;
a first set of perturbations imprinted on a first section of the optical fiber deployed proximate a first region of a downhole environment, the first set of perturbations being compatible with a first wavelength and operable to reflect a second portion of the optical pulses towards the first end of the optical fiber if a wavelength of the optical pulses is within a first range; and
a region devoid of any perturbation,
wherein the first portion and the second portion of the optical pulses are superimposed to improve signal to noise ratio of distributed acoustic sensing of the first region of the downhole environment, and
wherein a coherent optical time domain reflectometry technique is utilized to perform distributed acoustic sensing of the downhole environment and the region devoid of any perturbation.

12. The optical fiber of claim 11, further comprising:
a second set of perturbations imprinted on a second section of the optical fiber deployed proximate a second region of the downhole environment, the second set of perturbations being compatible with a second wavelength and operable to reflect a third portion of the optical pulses towards the first end of the optical fiber if the wavelength of the optical pulses is within a second range.

13. The optical fiber of claim 11, wherein a signal loss of the optical pulses due to the first set of perturbations is less than a first threshold db/km.

14. The optical fiber of claim 11, wherein an amplitude of the second portion of the optical pulses is greater than the amplitude of the first portion of the optical pulses by a first threshold ratio.

15. The optical fiber of claim 11, wherein one or more perturbations of the first set of perturbations are fiber bragg gratings.

16. The optical fiber of claim 11, wherein the optical fiber has an end to end length of at least one kilometer.

17. A method to improve distributed acoustic sensing properties of an optical fiber deployed in a downhole environment, comprising:
deploying a first section of the optical fiber proximate a first region of the downhole environment, the optical fiber having a first end, an opposite second end, and a region devoid of any perturbation, and the optical fiber being formed from a material having a first Rayleigh back-scattering coefficient, the first section of the optical fiber having a first set of perturbations imprinted across said first section of the optical fiber, and each perturbation of the first set of perturbations being compatible with a first wavelength;
transmitting optical pulses through the optical fiber towards the first region of the downhole environment;
receiving a first reflected portion of the optical pulses proximate the first end of the optical fiber, the first reflected portion having an amplitude based on the Rayleigh back-scattering coefficient of the optical fiber; and
receiving a second reflected portion of the optical pulses proximate the first end of the optical fiber if a wavelength of the optical pulses is within a first range, the second reflected portion of the optical pulses being reflected by the first set of perturbations,
wherein the first reflected portion and the second reflected portion of the optical pulses are superimposed proximate the first end of the optical fiber, and
wherein a coherent optical time domain reflectometry technique is utilized to perform distributed acoustic sensing of the downhole environment and the region devoid of any perturbation.

18. The method of claim 17, further comprising:
deploying a second section of the optical fiber proximate a second region of the downhole environment, the second section of the optical fiber having a second set of perturbations imprinted across said second section of the optical fiber, and each perturbation of the second set of perturbations being compatible with a second wavelength; and
receiving a third reflected portion of the optical pulses proximate the first end of the optical fiber if the wavelength of the optical pulses is within a second range,
wherein the first reflected portion and the third reflected portion of the optical pulses are superimposed proximate the first end of the optical fiber.

* * * * *